US010215153B1

(12) United States Patent
Mufdi

(10) Patent No.: US 10,215,153 B1

(45) Date of Patent: Feb. 26, 2019

(54) BUOYANCY MILL A MACHINE THAT PRODUCES CLEAN USEFUL MECHANICAL ENERGY USING BUOYANCY AS A PROPELLANT

(71) Applicant: Jorge (George) Bishara Mufdi, Cheyenne, WY (US)

(72) Inventor: Jorge (George) Bishara Mufdi, Cheyenne, WY (US)

( * ) Notice: Subject to any disclaimer, the term of this patent is extended or adjusted under 35 U.S.C. 154(b) by 0 days.

(21) Appl. No.: 15/990,740

(22) Filed: May 28, 2018

(51) Int. Cl.
*F03B 15/00* (2006.01)
*F03B 17/04* (2006.01)

(52) U.S. Cl.
CPC .............. *F03B 17/04* (2013.01); *F03B 15/00* (2013.01); *Y02E 60/17* (2013.01)

(58) Field of Classification Search
CPC ................................. F03B 17/04; F03B 15/00
See application file for complete search history.

(56) References Cited

U.S. PATENT DOCUMENTS 4,015,366 A * 4/1977 Hall, III ............... A01D 46/005 137/236.1
4,273,650 A * 6/1981 Solomon ................ B09C 1/002 210/104
4,380,419 A * 4/1983 Morton ..................... F03D 9/00 417/334
4,834,620 A * 5/1989 Sweeney ............... F04B 47/024 417/233
8,112,992 B2 * 2/2012 Pirincci .................. H02K 53/00 60/495
8,920,135 B2 * 12/2014 Daily ...................... F04B 35/01 417/320
9,745,952 B2 * 8/2017 Westmoreland .......... F03G 3/00
2014/0346099 A1 * 11/2014 Brantley ................ A01G 25/00 210/127
2017/0122284 A1 * 5/2017 Mesinger ................ F03B 13/06

* cited by examiner

*Primary Examiner* — Michael C Zarroli

(57) ABSTRACT

The Buoyancy Mill is a machine that has the ability to convert buoyant energy into useful mechanical energy using a double, parallel set of wheels three feet apart that supports and guides a double, parallel set of cable loops. Attached to the cable loops, at a distance of six feet apart are carriages on crossbars that capture floats as they buoyantly ascend, setting into motion the cable loop and the set of wheels. Once in motion, the Buoyancy Mill begins its conversion of buoyant energy into useful mechanical energy. Because the mill can be located anywhere energy is needed, costly mechanisms for delivering the energy are unnecessary. The mill is a closed system and uses a limited amount of water which is continually recycled with only minimal waste from splash or evaporation. This clean energy produced could be used, among other things, to create pollution-free electricity.

1 Claim, 6 Drawing Sheets

BUOYANCY MILL A MACHINE THAT PRODUCES CLEAN USEFUL MECHANICAL ENERGY USING BUOYANCY AS A PROPELLANT

INTRODUCTION

The need for clean energy production is presently a significant problem as the planet seeks to prevent further damage due to climate change consequences. An investigation of clean energy production reveals that wind energy, solar panels, dams and other thermal projects generate clean energy. Unfortunately, the majority of energy produced for global consumption does not come from clean sources. Further investigation of clean energy sources demonstrated a dearth of research or projects that use buoyancy as a sole power source for energy generation.

While buoyancy has been used to generate energy, it is typically used in combination with other energy sources. Because the Buoyancy Mill uses buoyancy as the sole source of energy, it generates useful mechanical energy without reliance on secondary energy sources and their associated costs. The mechanical energy generated by the mill can be used for a variety of purposes, including the production of pollution-free electricity using an electric generator.

BACKGROUND OF THE INVENTION

The Buoyancy Mill, a pollution-free machine is composed of two separate sections, one above-ground the other is underground. These two sections work together to achieve the goal of the Buoyancy Mill, which is, to convert buoyant energy into useful mechanical energy. This produced energy could be used, among other things, to produce, with the help of an electric generator, pollution-free electricity. The tragedies of Chernobyl in Russia and Fukushima in Japan tend to reinforce the need for pollution-free, mechanical energy. The Buoyancy Mill machine will provide such pollution free mechanical energy for producing clean electricity.

SCIENTIFIC BASIS OF THE INVENTION

The following scientific information was taken from the text book, Experiences in Physics, (Willard, L. R. 1949). The following information, used as the scientific basis for this invention, is a distillation of the scientific facts about the weight and pressure of liquids (Willard, p. 56-59), and Archimedes' Principal (Willard, p. 73-74). Using the book's provided formula it was possible to calculate the amount of energy created by this machine. Several pertinent scientific facts from this reading apply to the Buoyancy Mill.

1. The Archimedes principle that states, "A body floating or submerged in a fluid is buoyed up by a force equal to the weight of the fluid displaced" minus the object's weight.
2. That pressure in a body of liquid is dependent upon depth, and that it is exerted equally in all directions at any given depth,
3. That pressure at one foot depth in a liquid is 0.433 pounds (lbs.) per square inch (PSI).
4. The difference between downward and upward pressure for a floating object in water will always be the same for any depth.
5. That a cubic foot ($ft^3$) of water weighs 62.4 lbs.
6. "Average pressure in lb./sq. in.=0.433×average depth in feet (Willard, p. 58).

7. "The formula for the total pressure on the side of a container is Total pressure=0.433×average depth in feet×area of side in square inches" (Willard, p. 58).

Using these seven scientific facts, the amount of pressure and the resultant buoyancy force created at various depths by various floating objects can be calculated. The Buoyancy Mill uses floats that are 24 cubic inches, (area=24×24)=576 square inches that will be the area of the floating object affected by the forces that act upon the float.

To clarify, the two sides of the object (float) affected by the forces will be the top and bottom surfaces of the float. The top surface of the float is impacted by downward forces while the bottom surface of the float is impacted by upward forces.

The pool of water in the above-ground section is 9 $ft^2$ and 24 feet deep. During each cycle, the mill uses ten 24" square floats; thus, the total height of the ten floats will be twenty feet high if stacked upon each other. The calculation of created energy requires that 1 foot of depth above the top of the last float be included, which gives a total height of 21 ft. Thus, 21 ft. will be used as the depth in liquid instead 20 ft.

A float submerged in a liquid will be subjected to three different forces:

The weight of the float itself, a downward force

The weight of the column of water on top of the float, a downward force

The buoyant energy force that equals the weight of the volume of displaced liquid, an upward force If the total combined downward force is larger than the upward buoyant force, the object will sink.

If the buoyant force is larger than the total downward force, the object will float.

To illustrate, we will combine the two downward forces into one downward force aimed at the top surface of the float, and one upward force aimed at the bottom surface of the float by the buoyant force exerted upon the float. The chart below documents the journey of each float in the pool, and the amount of energy produced by each individual float. The chart also shows the difference in the two forces involved—the downward force and the upward force of buoyancy.

The downward force is composed of the weight of the column of water on top of the float at various depths plus the weight of the float itself, which we will assume to be approximately 50 lbs. This downward force is acting upon the top surface of the float which is, in our case, an area of 576 square inches. Using the formula for pressure, (Depth×pressure×area=energy created or upward force), we find that at a depth of one foot, there will be 249.408 lbs. of pressure (1 ft.×0.433×576=249.408 lbs.).

At a depth of 3 feet, the upward buoyant force on the bottom surface of the float (1 ft. water depth+2 ft. float height=3 ft.) is equal to the weight of the displaced volume of water. In this case the upward force will be 748.224 lbs. (3×0.433×576=748.224 lbs.).

The following resultant figures (448.816 lbs.) may vary depending of the weight of the float. The weight of the float may differ depending on the material with which it is composed.

| Formula: Depth × Pressure (0.433in.) × Area Affected (576 in. sq.)= | Depth of Float in water | Results in lbs. at various depths | The difference between up and down forces involved. The final result of upward force 448.816 lbs. by each float. At all depths, the results are the same 448.816 lbs. |
|---|---|---|---|
| 1 × 0.433 × 576 | 1 ft. | 249.408 lbs. | |
| | | | 748.224 − 249.408 + 50 = 448.816 lbs. |
| 3 × 0.433 × 576 | 3 ft. | 748.224 lbs. | |
| | | | 1247.04 − 748.224 + 50 = 448.816 lbs. |
| 5 × 0.433 × 576 | 5 ft. | 1247.04 lbs. | |
| | | | 1745.856 − 1247.04 + 50 = 448.816 lbs. |
| 7 × 0.433 × 576 | 7 ft. | 1745.856 lbs. | |
| | | | 2244.672 − 1745.856 + 50 = 448.816 lbs. |
| 9 × 0.433 × 576 | 9 ft. | 2244.672 lbs. | |
| | | | 2743.488 − 2244.672 + 50 = 448.816 lbs. |
| 11 × 0.433 × 576 | 11 ft. | 2743.488 lbs. | |
| | | | 3242.304 − 2743.488 + 50 = 448.816 lbs. |
| 13 × 0.433 × 576 | 13 ft. | 3242.304 lbs. | |
| | | | 3741.12 − 3242.304 + 50 = 448.816 lbs. |
| 15 × 0.433 × 576 | 15 ft. | 3741.12 lbs. | |
| | | | 4239.936 − 3741.12 + 50 = 448.816 lbs. |
| 17 × 0.433 × 576 | 17 ft. | 4239.936 lbs. | |
| | | | 4738.752 − 4239.936 + 50 = 448.816 lbs. |
| 19 × 0.433 × 576 | 19 ft. | 4738.752 lbs. | |
| | | | 5237.568 − 4738.752 + 50 = 448.816 lbs. |
| 21 × 0.433 × 576 | 21 ft. | 5237.568 lbs. | |

The resultant upward force figure of 448.816 lbs. for each float is multiplied by ten floats per cycle equaling 4488.16 lbs. Adding to this figure, 4488.16 lbs., is the mechanical advantage provided by the set of large wheels. The 10 ft. radius from the main axle is multiplied by (4488.16 lbs.) equaling (44,881.6 lbs.) acting upon the main axle, according to the formula:

Torque=Force×radius ($F \times r = T$) thus, 4488.16 lbs.×10=44881.6 lbs.

Search of Patent Applications Relating to Buoyancy

Below is a list of patents that claim to use buoyant energy as a prime mover. While these inventions utilize buoyant energy, they do so only in conjunction with other energy sources and none were found that buoyancy was the sole driving force, and if it was the sole force it seems an impracticable solution.

BRIEF SUMMARY OF THE INVENTION

The Buoyancy Mill is a machine that generates clean, mechanical energy using buoyancy as the sole energy source. Notably, the mill is pollution-free, meaning it does not contribute to the devastation wrought by climate change problems. The mill works continuously, uninterrupted by variations in weather or lack of fuel. Because buoyant energy is a natural and inexhaustible energy force, the mill never runs out of fuel. A significant advantage of the buoyancy mill is that the mill does not need to be near a water or wind sources. Because the mill can be located anywhere energy is needed, costly mechanisms for delivering the energy are unnecessary. The mill is a closed system and uses a limited amount of water which is continually used, with only minimal waste from splash and evaporation.

The Buoyancy Mill, a pollution-free machine is composed of two separate sections, one above-ground the other is underground. These two sections work together to achieve the goal of the Buoyancy Mill, which is to convert buoyant energy into useful mechanical energy. This produced energy could be used, among other things, to produce, with the help of an electric generator, pollution-free electricity.

The function of the above-ground section is similar to the combustion center in the gas engine system where the power is generated. The above-ground section contains a large pool of water where buoyant energy is converted to mechanical energy when the buoyantly-infused floats are captured by carriages, causing the cable loop to start moving.

The underground section could be described as the mill's gas tank. This section provides the source of energy to the aboveground section. In this case, the energy provided is the buoyantly-infused floats. Within the underground section, floats are stored in a device called the buoyancy converter. Here, the passive floats are converted into buoyantly-infused floats, which are then released into the aboveground section and into the large water pool. In the large water pool, buoyant floats are captured by carriages attached to the cable loop. This action causes the cable loop to move and commence converting buoyant energy into useful mechanical energy.

To better understand the process of converting buoyant energy into useful mechanical energy, let us follow the process from the beginning until the end. Since this is cycle one, the passive floats are in the right conduit of the buoyancy converter. The passive floats are allowed to enter cavities 3 o'clock and 9 o'clock following a command from the command center. Another command to the core sends it 90 degrees counter clock, and with the core goes the 3 o'clock and the 9 o'clock cavities to the 6 o'clock and 12 o'clock position of the buoyancy converter, where the two gates at the bottom of the conduits entering 6 o'clock and 12 o'clock cavities to opens up allowing the water to fill the 6 o'clock and 12 o'clock cavities making the passive floats to become buoyantly infused and rise into the conduits and further on into the water pool in the aboveground section. Then the gates at the bottom of the conduits are shut completing the first cycle.

When the buoyantly infused floats enter the water pool in the aboveground section, they are captured by the carriages causing the cable loop to start moving, thus the process of converting the buoyant energy into useful mechanical energy is started. When the floats finish their buoyant task at the top of the water pool they lose their buoyant energy. Since the floats are out of water and are under gravity control they enter the return chute and into the conduits of the buoyancy converter to start another cycle.

DETAILED DESCRIPTION OF THE INVENTION

Figure 1:
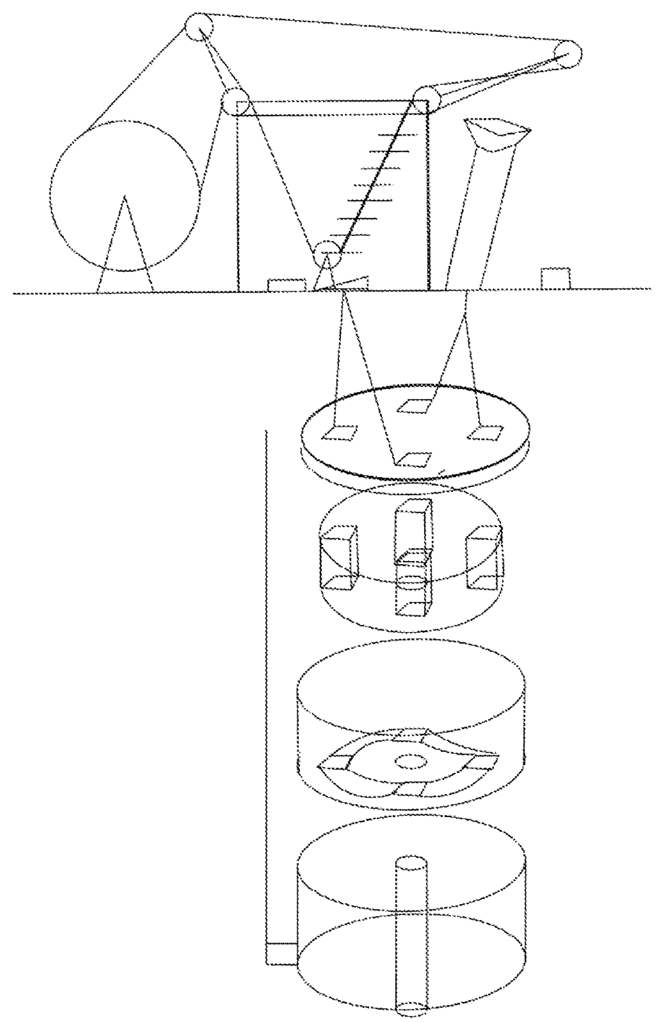
FIG. 1, like the rest of drawings in this presentation, is not to scale. Rather, it is a picture to inform the reader about this invention. This drawing does not contain any identification of parts because the identifications will follow.
Figure 2:
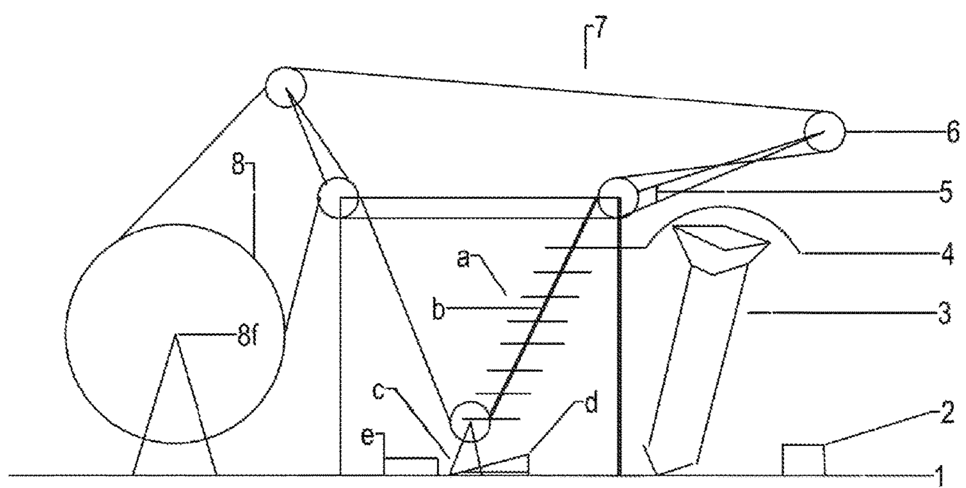
FIG. 2 is a drawing that conveys the idea of the aboveground section.

The Buoyancy Mill is a simple machine that generates pollution-free energy. The system's simplicity is manifested in the cumulative use of devices that are practical, time-tested systems which have been successfully used since or prior to the Industrial Revolution. Some of these systems include a cable loop, a wheel system that supports the cable loop, a water pool system and a carriage system, etc. The use of these systems in combination is what makes the mill a simple and effective machine. These systems, when utilized together in the buoyancy mill produces a respectable amount of energy that is clean, mechanical energy that can be used to generate clean electricity and power various projects cleanly.

The amount of mechanical energy continuously created by the combined efforts of the ten floats is significant, according to the calculations in the Scientific Basis (a must read) for the Buoyancy Mill section in this presentation. A single float produces 448.816 lbs. of torque, so the amount of energy created by the combined energy of the ten floats in one cycle, is 4488.16 lbs., the torque upon the axle of the large wheels, with a radius of ten feet, provides a mechanical advantage of (4488.16*10=44881.6 lbs.). This equates to more than twenty-two tons of turning power (torque) on the axle of the large wheels, which is more than enough power to create large amounts of clean electricity.

The Buoyancy Mill, constructed properly and with quality material will be durable and productive, avoiding breakage and the loss of energy production which is costly. The Buoyancy Mill is a unique, practical, inexpensive and scientifically-based project. The development of such mill can help alleviate the devastation wrought by climate change thru more powerful hurricanes, by producing clean electrical energy.

The Buoyancy Mill, a pollution-free machine is composed of two separate sections, one above-ground the other is underground. These two sections work together to achieve the goal of the Buoyancy Mill, which is, to convert buoyant energy into useful mechanical energy. This produced energy could be used, among other things, to produce pollution-free electricity with the help of an electric generator.

The two sections, above and underground, mentioned in the previous paragraph will be discussed and explained in more detail in the following presentation. The reader will better grasp the intent of this presentation if he checks the drawings while he is doing the reading.

Aboveground Section—The first item in this drawing of the aboveground section is a line that depicts the ground level that separates the two sections of Buoyancy Mill.

The second item in the drawing of the aboveground section of the buoyancy mill is the command center. The buoyancy mill's command center can be operated simply using an electrical command program as in the pre computer era or a more complex computer program. The choice of selection will be done by the experts in this field. The Command Center is where all commands are initiated and issued to all parts in the system. The commands will direct the designated part to engage in their prescribed function, guaranteeing the proper functioning of the system. The majority of the commands issued are aimed at the underground section or the buoyancy converter, only one command will be issued to the aboveground area. The command to the aboveground area is directed to the gate at the bottom of the large water pool, that shuts the gate in case of an emergency to prevent the waters in the water pool from pouring out.

The third item in the drawing of the aboveground section is the return chute. This chute receives the floats after they conclude their cycle in the large water pool in the aboveground section. Now, the floats are out of water and under the influence of gravity, causing the floats to fall into the return chute.

The fourth item in the same drawing mentioned above is the large water pool, where all the buoyant energy creation takes place in this invention when the buoyant floats are captured by the carriages causing the cable loop to start moving turning the buoyant energy into useful mechanical energy.

The large water pool is nine feet square and twenty four feet high, it is constructed from concrete with a plastic lining in the inside areas. The top rim of the large water pool is occupied by the metal structure that supports the double wheel system.

At the bottom floor center of the large water pool is the float entrance with a set of small wheels that support the cable system. It is at this float entrance where the capture of the buoyantly infused floats is started and the converting of buoyant energy into useful mechanical energy is started.

The next item in this drawing is the metal structure on top of the rim of the large water pool that supports the wheel system. This is followed by the double wheel system. This wheel system is composed of two different wheel sizes there are five sets of small wheels radius one foot and a single set of large wheels with a radius of ten feet. The face of the circumference of all the wheels contains a half circular groove to accommodate the circular shape of belt or the cable loop. The purpose for the large size wheels is to provide for the mechanical advantage in the calculations of the amount energy produced. The cable loop is the next item in the drawing. The cable loop is supported by the wheel system, together the two systems, transmit the energy created in the water pool to the axle at the large wheel center.

The last item in this drawing is the picture of the large wheels and the metal structure that supports the double wheel system. The large wheels were discussed in the previous segment on wheels above.

Figure 3:
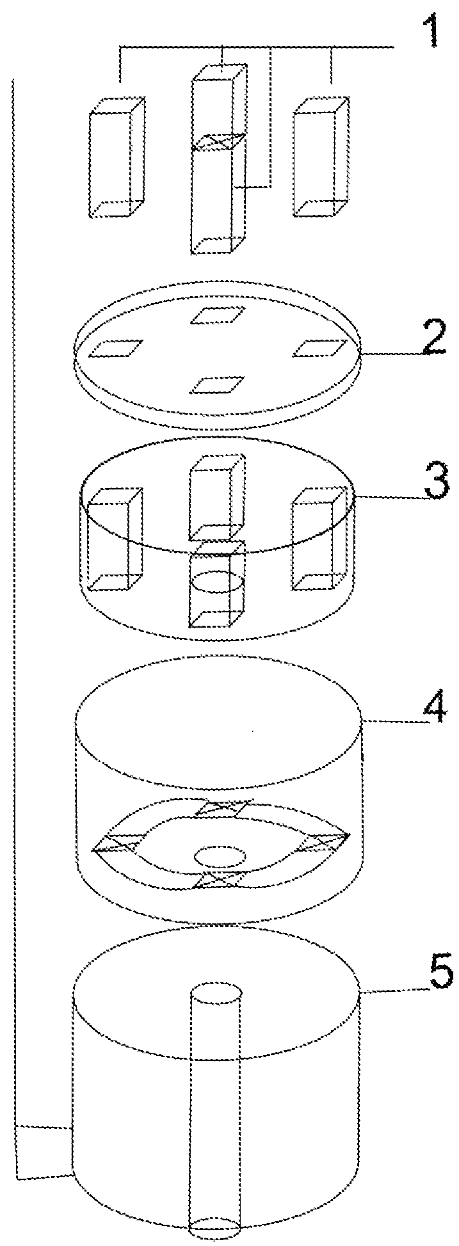
FIG. 3 is a drawing of all the parts included in the making of the device called the buoyancy converter which in fact, is the whole of the underground section. The depicted device is not assembled for clarity, as several parts are not visible once the converter is assembled.
Figure 4:
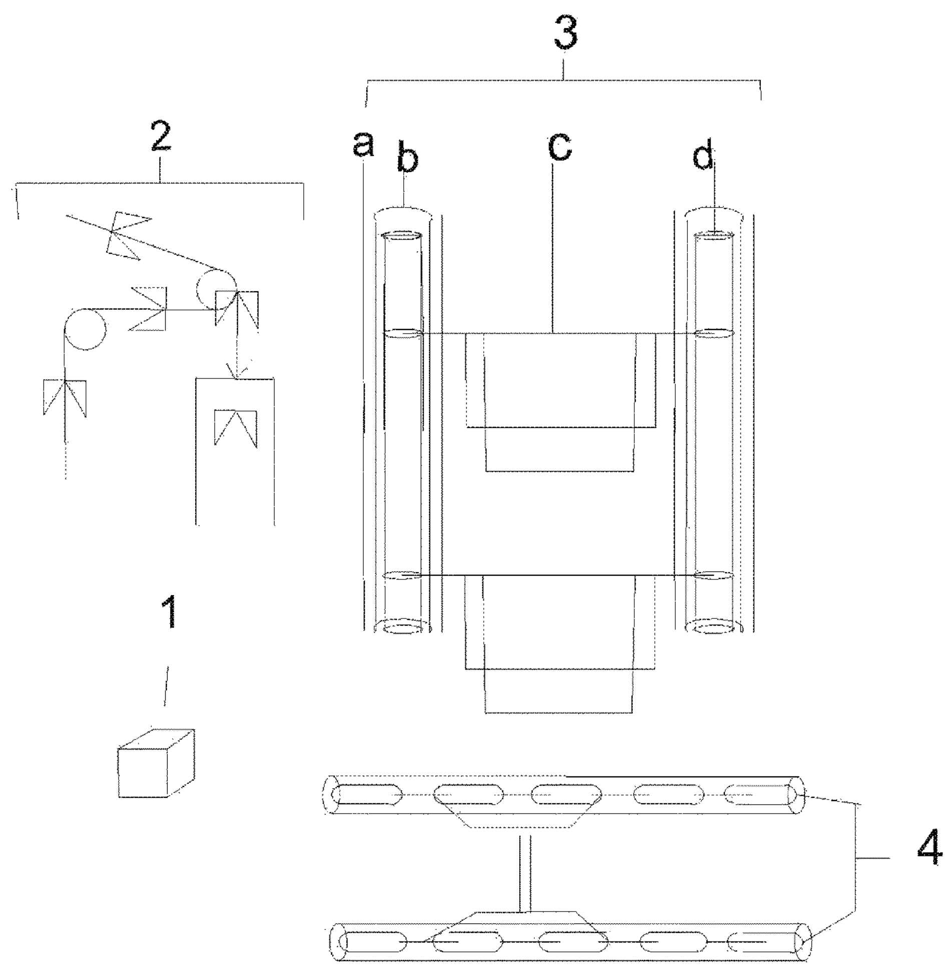
FIG. 4 is a drawing of the small items such as the floats and the spot in the double cable loop at the top of the large water pool when passive floats enter the return chute. Also the drawing shows birds eye view of the double cable loop passing over a wheel in the system with the crossbar holding carriages with captured floats and the insides of a cable loop member.
Figure 5:
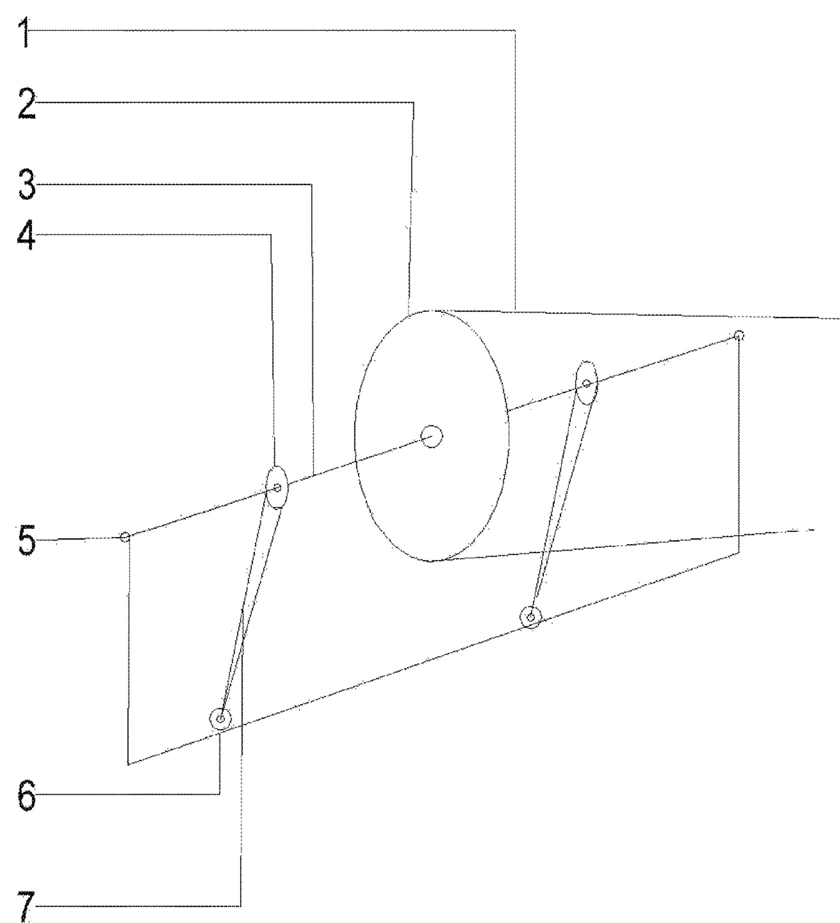
FIG. 5 is an arrangement of electric generators and the Buoyancy Mill, without a transmission, in the process of generating clean electricity.
Figure 6:
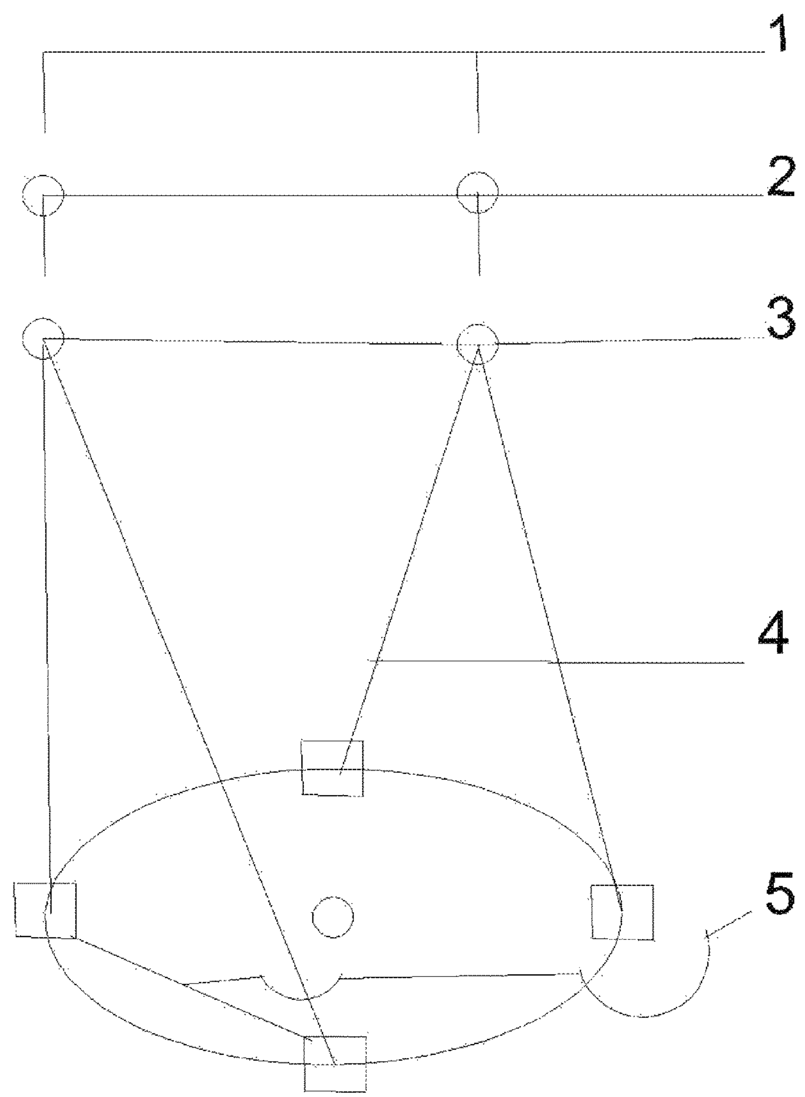
FIG. 6 is a drawing of the connections between the split conduits in the underground section and the aboveground section.

Underground section—(See FIG. 3 for description and identification of the underground Section components).

The buoyancy converter device is a machine that converts the passive state of a float into a buoyantly-infused state. The following is an identification and description of the items in this device and how the buoyancy converter works.

The four conduits, in the underground section connect to the aboveground section. Since there are only two openings at the bottom of the aboveground section, the four conduits in the underground section will be split into two groups. One of the split groups will connect to the return chute in the aboveground section and the other and the split group will connect to the float entrance in the aboveground section. The four conduits are made from metal with a size of 30" square and seven feet in length. The set of two conduits that connect to the bottom of the return chute in the aboveground section, each has a float control mechanism, not a gate, just a device that stops the float, from entering the cavity unless it is allowed by the control device at the bottom of the set of the two conduits. So the role of the set of two conduits is to supply passive state floats into the two cavities bellow.

For the sake of clarity, the four cavities in the core will be identified as 3 o'clock, 6 o'clock, 9 o'clock and 12 o'clock cavities.

The other set of two conduits that is connected to the float entrance at the bottom of the large water pool are full of water from the water pool above and contain at their bottom of each conduit a gate that retains the water above when closed, and allows the contained water to gush into the cavity below when open. This causes the now buoyantly-infused float in the cavity to rise into the conduit above and eventually into the aboveground pool causing the gate to close with the end of a cycle and the start of a new cycle.

Immediately after this action is completed, the command center issues a command to the core to move counter clockwise 180 degrees, while the 3 o'clock and the 12 o'clock cavities are traveling to 6 o'clock and 9 o'clock position over the opening at the bottom of the shell's floor, they will discharge their content of water into the storage tank bellow. A new cycle starts.

The cover of the buoyancy converter device with a circular radius of 3.5 feet and the height of one foot contains four square openings 2.5 feet square to accommodate the four above mentioned conduits.

The core has a radius of 3.5 feet and a height of 2.5 feet and contains four cavities, 90 degrees apart. This core rotates counter clockwise, 180 degrees or half of a circle each time it turns. The four cavities inside the core are each 2.5 cubic feet and are located 90 degrees apart. Both ends of the four cavities are open and fitted with seals to prevent water leakage.

For the sake of clarity, the four cavities will be identified as 3 o'clock, 6 o'clock, 9 o'clock and 12 o'clock cavities. A motor, located in the bottom of the converter shell, turns the core, rotating the cavities.

The shell container that houses the core has a radius of 3.5 feet (plus) to allow the core to fit in the shell, with a height of 2.5 feet. The opening at the bottom of the shell's floor, located between the four cavities, is for allowing the discharged waters into the storage tank while cavities are moving towards a new location. The location at the center of the shell's floor is for the electric motor that turns the core.

The storage water tank, with a radius of three feet and a height of three feet stores the discharged water from cavities above. The pump, with the help of a long pipe, pumps the water from the storage tank upwards into the large water pool in the aboveground section to replace the waters used to fill the cavities bellow when needed.

To demonstrate how the Buoyancy Mill works, let us follow the journey of a single pair of floats from the start of the cycle in this invention to the end of the cycle, when the buoyantly infused floats reach the top of the large water pool. Having lost their buoyant energy since the pair of floats is out of water, gravity takes over and the float falls into the return chute. Since this is cycle one, some items have to be ready before the action can commence:

A. The four conduits are attached to the four cavities in the core below. The two conduits connected at 6 o'clock and 9 o'clock are full of water from the large water pool in the above-ground section. Each of these two conduits has a gate at the bottom that contains the water when closed and allows the water to fill the cavity below when the gates are open.

B. The floats are in the two conduits attached to the 3 o'clock and 12 o'clock cavities of the buoyancy converter, ready to start their journey. The command center then issues a command to the control at the top of the two conduits to open, allowing the floats to enter the 3 o'clock and 12 o'clock cavities.

C. Once the floats enter the cavities, the core is commanded to move counter clockwise 180 degrees so that the 3 o'clock and 12 o'clock cavities to become the 6 o'clock and 9 o'clock cavities.

D. Next, the command center sends a signal to the gates at the bottom of the two conduits, connected to the two cavities below, to open. This action causes the 6 o'clock and 9 o'clock cavities to be submerged with water. When this takes place the floats in the cavities, infused with the new buoyant energy, rises into the conduits aiming to reach the large water pool in the aboveground section.

E. Once the floats rise, the gates at the bottom of the two conduits close. After the gates close, the core is commanded to move 180 degrees counter clockwise. This will return 6 o'clock and 9 o'clock cavities to 3 o'clock and 12 o'clock cavities location. While the core is moving above the two openings in bottom of the shell floor, the two cavities discharge their water into the storage tank below.

F. When the buoyantly-infused floats enter the large water pool in the aboveground section, they are captured by the carriages in the cable loop. This causes the loop to go into motion propelled by the buoyantly-infused floats. Thus, the conversion from buoyant energy to mechanical energy begins. When the floats finish their task at the top of the large water pool they lose their buoyancy. Gravity takes over and the floats fall into the return chute to start another cycle.

Commands—The following commands are issued by the command center to accomplish the above functions.

1. Command A is issued to the electric motor located on top of the two split conduits that connect to 3 o'clock and 9 o'clock cavities. This controls the entrance of floats into the 3 o'clock and 9 o'clock cavities.
2. Command B is issued to the electric motor located at the bottom center of the shell of the buoyancy converter) to turn the core 90 degrees counter clockwise. Now 3 o'clock and 9 o'clock cavities displace 6 o'clock and 12 o'clock cavities.
3. Command C is issued to the electric motor at the bottom of both split conduits. The conduits which are connected to 6 o'clock and 12 o'clock cavities now open. When the gates are open the water in both conduits flows into the cavities below buoyantly energizing the passive floats. The newly buoyant floats ascend into the conduits and then into the large water pool in the aboveground section. After the float rises the gates are commanded to shut.
4. Command E is issued to the electric motor located on the bottom center of the buoyancy converter's shell. Command E turns the core 90 degrees counter clockwise. While the core is moving over the opening in the bottom of the shell's floor, the waters in the cavities are discharged into the water storage tank below. When this action is complete, the 12 o'clock and 6 o'clock cavities are back in 3 o'clock and 9 o'clock position. The beginning of a new cycle is started.

5. Command F is issued to the electric motors at the bottom side of the water storage tank. These motors operate the pumps, transferring the discharged water through pipes, upwards into the large water pool in the aboveground section.

The invention claimed is:

1. A buoyancy mill comprising;

two separate sections, one above ground and the other underground, the above ground section is further comprised of;

a command center that controls the operation of the buoyancy mill, a return chute that receives and transports floats, a water pool, this water pool contains;

carriages on a cable loop that capture the floats and transport them, a support structure on the rim of the water pool that supports a double wheel system, this wheel system is composed of two different wheel sizes, the face of the circumference of all the wheels contains a half circular groove to accommodate the circular shape of belt or the cable loop, at the bottom floor center of the water pool is;

a float entrance with a set of small wheels that support the cable loop system, and two openings, the underground section is comprised of buoyancy converter that is comprised of the following components;

four conduits that connect with the above ground section, the four conduits are divided into two groups of two conduits each, one of the groups connects with the return chute and the other group connects with the float entrance, the conduits connected to the float entrance have a gate at their bottom to retain water above, the floats are stored in a passive condition in the buoyancy converter, these passive floats are converted into buoyantly-infused floats, which are then released into the aboveground section and into the water pool, in the water pool, the buoyantly moving floats are captured by carriages attached to the cable loop, this action causes the cable loop to move and commence converting buoyant energy into useful mechanical energy.

* * * * *